(12) United States Patent
Hall et al.

(10) Patent No.: US 10,352,413 B2
(45) Date of Patent: Jul. 16, 2019

(54) GEARLESS TRANSMISSION

(71) Applicant: Novatek IP, LLC, Provo, UT (US)

(72) Inventors: Michael Hall, Springville, UT (US); Samuel Tate Brown, Heber City, UT (US)

(73) Assignee: NOVATEK IP, LLC, Provo, UT (US)

( * ) Notice: Subject to any disclaimer, the term of this patent is extended or adjusted under 35 U.S.C. 154(b) by 348 days.

(21) Appl. No.: 15/415,815

(22) Filed: Jan. 25, 2017

(65) Prior Publication Data
US 2018/0209520 A1 Jul. 26, 2018

(51) Int. Cl.
*F16H 21/14* (2006.01)

(52) U.S. Cl.
CPC .................. *F16H 21/14* (2013.01)

(58) Field of Classification Search
CPC .................. F16H 21/12; F16H 21/14
USPC .................................................. 74/69
See application file for complete search history.

(56) References Cited

U.S. PATENT DOCUMENTS

| | | | | |
|---|---|---|---|---|
| 416,630 A * | 12/1889 | Jorgensen | ............... | F16H 21/14 74/69 |
| 771,261 A * | 10/1904 | Monin | ............... | F16H 21/14 74/69 |
| 986,347 A * | 3/1911 | Beese | ............... | F16H 21/14 74/520 |
| 1,115,000 A * | 10/1914 | Martin | ............... | F16H 21/14 352/180 |
| 1,269,935 A * | 6/1918 | Howard | ............... | F16H 21/14 74/3 |
| 2,748,610 A * | 6/1956 | Wolf | ............... | F16H 1/32 475/162 |
| 3,286,550 A * | 11/1966 | Rosain | ............... | F16H 1/32 475/162 |
| 3,530,731 A * | 9/1970 | Lothar | ............... | B30B 15/0023 74/69 |
| 5,823,906 A | 10/1998 | Ashburn et al. | | |
| 8,128,111 B2 | 3/2012 | Scolari et al. | | |
| 8,919,774 B2 | 12/2014 | Scolari et al. | | |
| 8,925,406 B1 * | 1/2015 | Borovskikh | ............... | F16H 21/14 74/67 |
| 9,114,848 B2 | 8/2015 | Scolari et al. | | |

\* cited by examiner

*Primary Examiner* — Terence Boes
(74) *Attorney, Agent, or Firm* — Philip W. Townsend, III

(57) ABSTRACT

A gearless transmission may provide a similar outcome to a gear train, without meshing teeth. Such a gearless transmission may comprise an input shaft comprising a plurality of lobes disposed thereon. The lobes may extend radially from the input shaft in opposite directions from one another. Each of the lobes may comprise a plurality of connecting rods freely rotatable thereabout. Each of the connecting rods may be slidably attached to a hollow body disposed around the input shaft. The hollow body may be formed from a plurality of rings fixed together and secured to an output shaft.

20 Claims, 7 Drawing Sheets

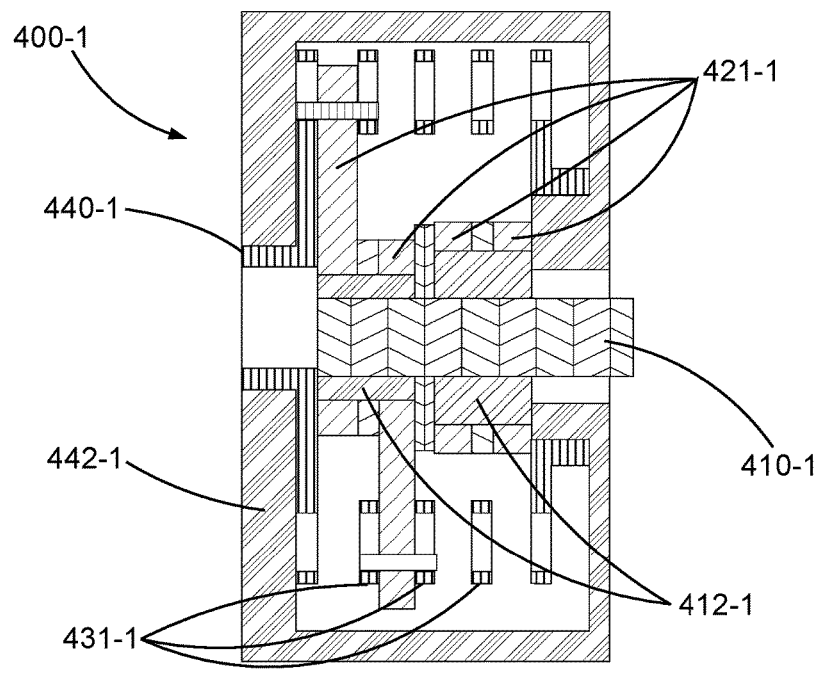
Figure 4-1
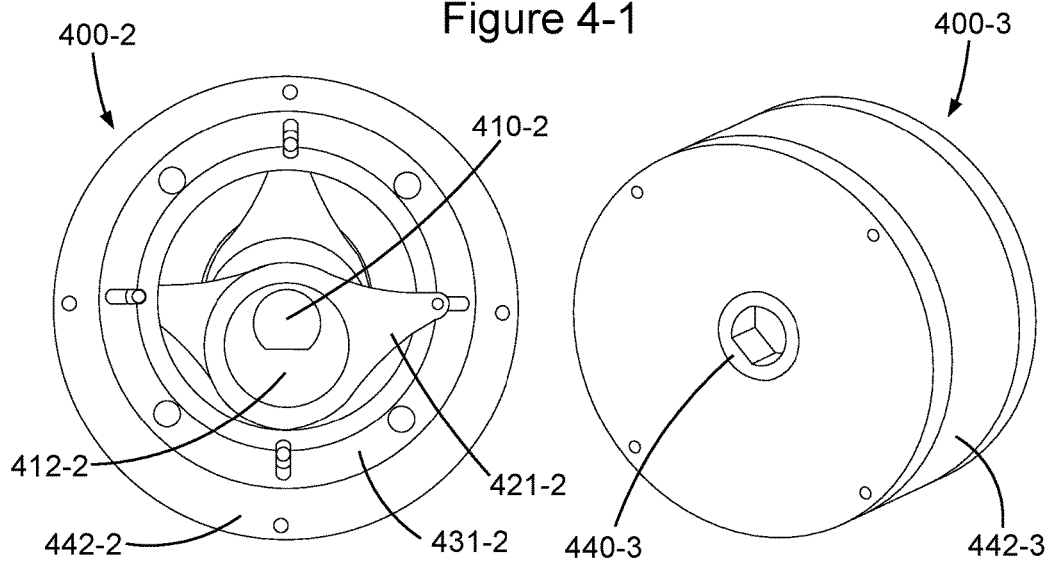
Figure 4-2
Figure 4-3

GEARLESS TRANSMISSION

BACKGROUND

Gear trains are common mechanical systems generally formed by mounting a plurality of gears relative to each other such that teeth of adjacent gears engage one another. When designed properly, such gear trains may provide a smooth transmission of rotation from one gear to the next. The rotational speed and torque of each gear in a gear train may differ. For instance, a rotational speed of one gear in a gear train may differ from a rotational speed of an adjacent gear by a proportional rate known as a speed ratio. The speed ratio may be calculated by dividing the number of teeth of the input gear by the number of teeth of the output gear, or alternatively the radius of pitch circle of the input gear by the radius of pitch circle of the output gear. A torque of one gear in a gear train may also differ from a torque of an adjacent gear by a proportional rate known as a torque ratio. The torque ratio may be calculated by dividing the number of teeth of the output gear by the number of teeth of the input gear, or the radius of pitch circle of the output gear by the radius of pitch circle of the input gear.

While gear trains are well known and their operating properties widely praised, their performance while exposed to abrasive fluids leaves much to be desired. Specifically, abrasive fluids may work their way between meshing gear teeth rapidly wearing them away due to their repetitive engagement and disengagement. Gear teeth also generally require extensive machining to ensure smooth meshing between gears which may increase manufacturing costs. Thus, an alternative to a gear train capable of transmitting rotational motion, less susceptible to wear from abrasive fluids and easier to manufacture may be desirable.

BRIEF DESCRIPTION

A gearless transmission may provide a similar outcome to a gear train, without meshing teeth. Such a gearless transmission may comprise an input shaft with a plurality of lobes disposed thereon. The lobes may extend radially from the input shaft in opposite directions from one another. Each of the lobes may comprise a plurality of connecting rods freely rotatable thereabout. Each of the connecting rods may be slidably attached to a hollow body surrounding the input shaft. The hollow body may comprise a plurality of rings fixed together and secured to an output shaft that is axially offset from the input shaft.

The lobes, connecting rods and rings may form a plurality of four-bar linkages. In particular, each of the lobes may act as a crank for a plurality of four-bar linkages, each of the connecting rods may act as a coupler for a unique four-bar linkage, and each of the rings may act as a follower for one of the unique four-bar linkages. These four-bar linkages may allow the output shaft to rotate at a slower rotational speed on average than the input shaft while providing more torque.

DRAWINGS

FIGS. 2-1 and 2-2 are perspective and orthogonal views, respectively, of embodiments of connecting rods extending radial from a plurality of lobes.

FIGS. 3-1 and 3-2 are perspective and orthogonal views, respectively, of embodiments of a plurality of rings slidably attached to connecting rods.

FIGS. 4-1, 4-2 and 4-3 show longitude-sectional, cross-sectional and perspective views, respectively, of embodiments of a housing maintaining relative positioning of an input shaft and an output shaft.

FIG. 5-1 shows a cross-sectional view of an embodiment of a four-bar linkage formed by a lobe acting as a crank, a connecting rod acting as a coupler and a ring acting as a follower. FIG. 5-2 shows a figurative representation of four four-bar linkages.

FIGS. 6-1, 6-2 and 6-3 show cross-sectional views and figurative representations of various embodiments of power quadrants of four-bar linkages.

FIGS. 7-1, 7-2 and 7-3 show one longitude-sectional and two perspective views, respectively, of embodiments of a gearless transmission comprising two sets of input shafts, lobes, connecting rods, rings and output shafts.

DETAILED DESCRIPTION

Figure 1:
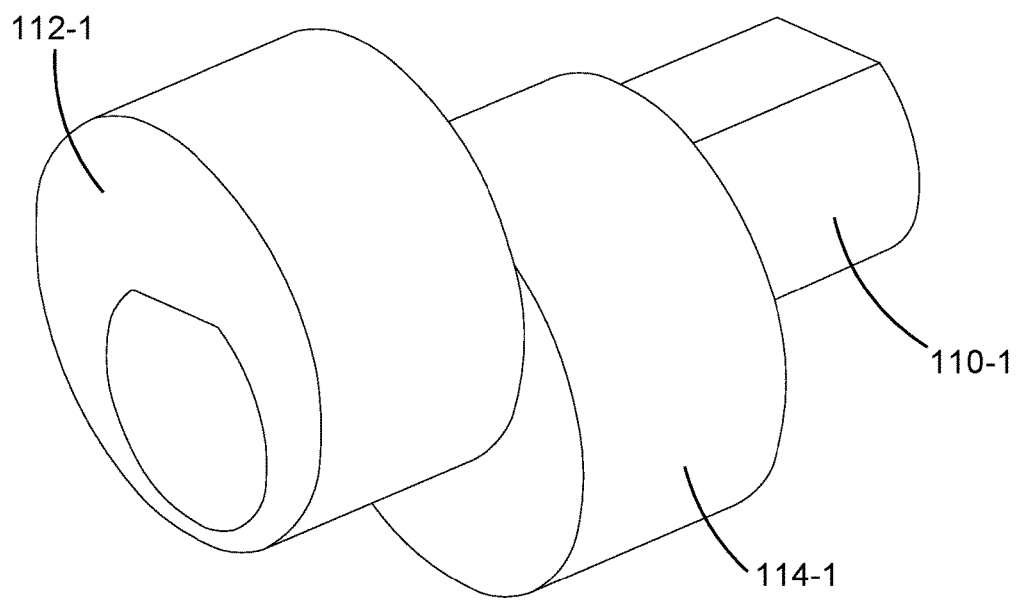
FIGS. 1-1 and 1-2 are perspective and orthogonal views, respectively, of embodiments of an input shaft, that may form part of a gearless transmission, comprising a plurality of lobes extending therefrom.
Figures 1, 2:
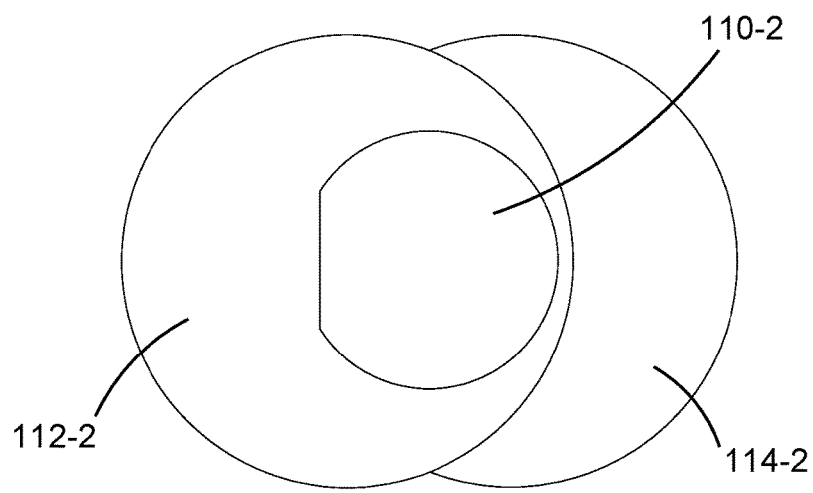
Figures 1, 2:
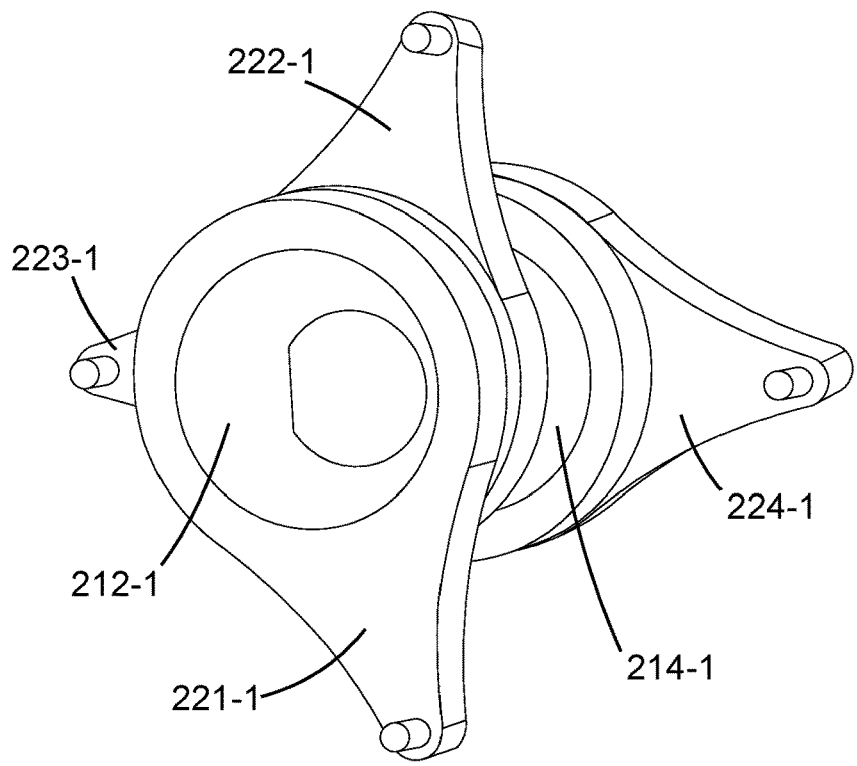
Figure 2:
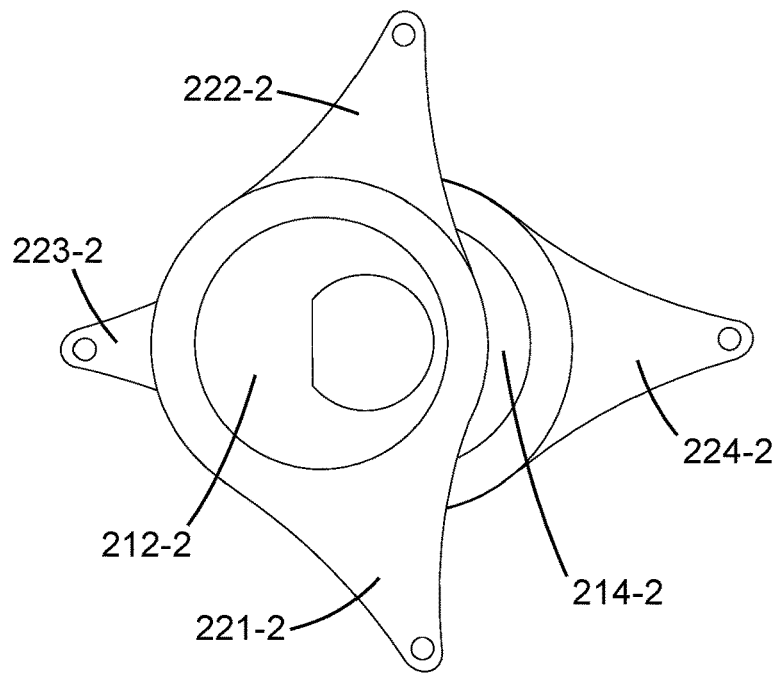

FIGS. 1-1 and 1-2 show embodiments an input shaft 110-1, 110-2 that may form part of a gearless transmission. A plurality of lobes may extend radially from the input shaft 110-1, 110-2. In this case, two lobes 112-1, 112-2, 114-1, 114-2 extend from the input shaft 110-1, 110-2 in opposite directions from one another. In some embodiments, these lobes may be formed as integral parts of an input shaft. However, in the embodiment shown, the two lobes 112-1, 112-2, 114-1, 114-2 comprise independent bodies with a non-coaxial hole passing therethrough such that the input shaft 110-1, 110-2 may be secured within the hole. The input shaft 110-1, 110-2 may comprise a non-circular cross-sectional geometry, such as a D-shape in the embodiment shown, allowing for rotation of the input shaft 110-1, 110-2 to be transferred to the lobes 112-1, 112-2, 114-1, 114-2.

FIGS. 2-1 and 2-2 show embodiments of a plurality of connecting rods that may extend radially from a plurality of lobes. In the embodiments shown, two connecting rods 221-1, 221-2, 222-1, 222-2 extend from a first lobe 212-1, 212-2 and two other connecting rods 223-1, 223-2, 224-1, 224-2 extend from a second lobe 214-1, 214-2. Each of the connecting rods 221-1, 221-2, 222-1, 222-2, 223-1, 223-2, 224-1, 224-2 may be freely rotatable about its respective lobe 212-1, 212-2, 214-1, 214-2.

Figures 1, 3:
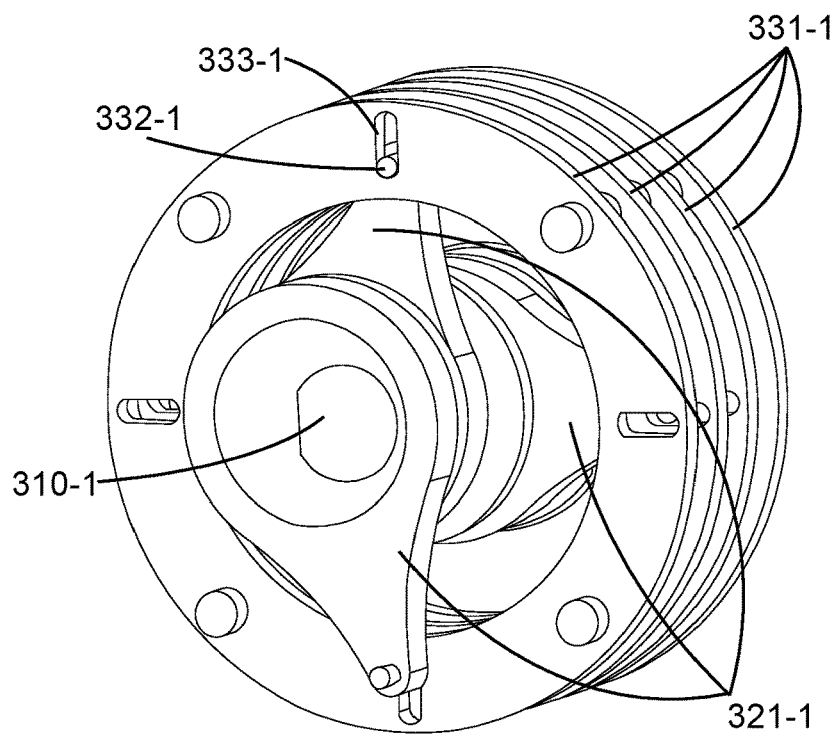
Figures 2, 3:
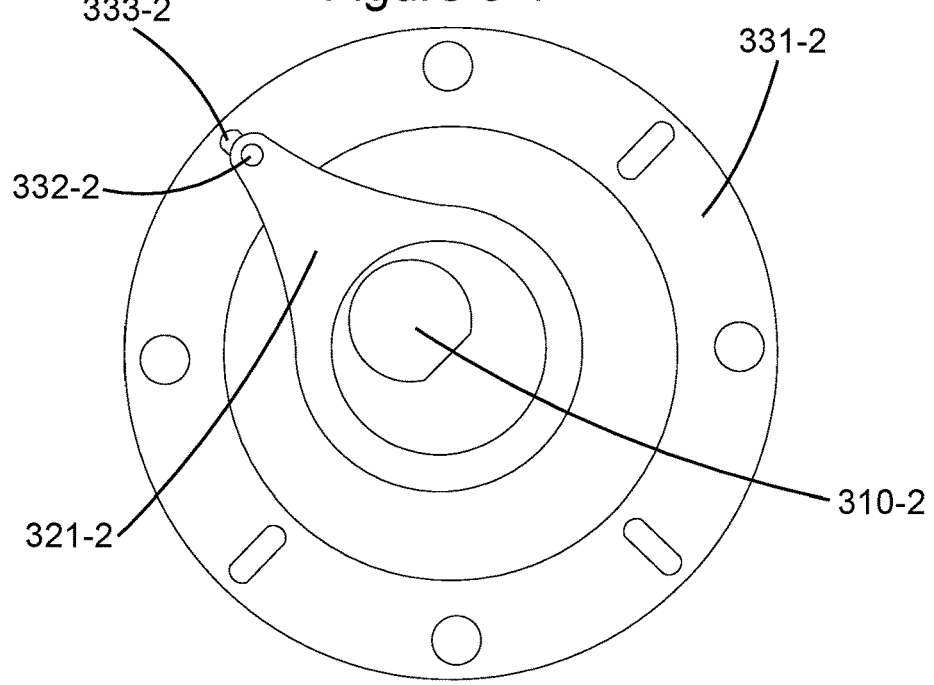

FIGS. 3-1 and 3-2 show embodiments of a plurality of connecting rods 321-1, 321-2 attached to unique rings 331-1, 331-2 that may be fixed together to form a hollow body encircling an input shaft 310-1, 310-2. Each of the connecting rods 321-1, 321-2 may be attached by a slidable connector. In the embodiment shown, each slidable connector comprises a pin 332-1, 332-2 protruding from its respective connecting rod 321-1, 321-2 that may fit within an elongated slot 333-1, 333-2 radially extending along a specific ring 331-1, 331-2. Such a pin 332-1, 332-2 may be free to slide within its respective elongated slot 333-1, 333-2. Positioning of the elongated slots 333-1, 333-2 around a circumference of the rings 331-1, 331-2 may space the connecting rods 321-1, 321-2 substantially 90 degrees apart from one another generally around the input shaft 310-1, 310-2.

While other embodiments may comprise fewer parts, such parts may require intricate machining to manufacture. The embodiments shown in FIGS. 3-1 and 3-2 may be fairly simple to manufacture given that each of the connecting rods 321-1, 321-2 and rings 331-1, 331-2 may be formed from a flat sheet of material by stamping, laser cutting, electrical discharge machining or other known methods. Simplified manufacturing may also allow parts to be made out of harder, more wear resistant materials such as polycrystalline diamond or carbide. Further manufacturing simplicity may result when each of the connecting rods 321-1, 321-2 is substantially identical to each other connecting rod 321-1, 321-2 and each of the rings 331-1, 331-2 is substantially identical to each other ring 331-1, 331-2 as shown in this embodiment.

FIGS. 4-1, 4-2 and 4-3 show embodiments of a gearless transmission 400-1, 400-2, 400-3 comprising an input shaft 410-1, 410-2 with two lobes 412-1, 412-2 extending radially therefrom, two connecting rods 421-1, 421-2 extending radial from each of the lobes 412-1, 412-2, each of the connecting rods 421-1, 421-2 slidably attached to rings 431-1, 431-2, and the rings 431-1, 431-2 fixed to an output shaft 440-1, 440-3. In this configuration, the output shaft 440-1, 440-3 may be parallel with but axially offset from the input shaft 410-1, 410-2. A housing 442-1, 442-2, 442-3 may maintain this axial offset between the output shaft 440-1, 440-3 and the input shaft 410-1, 410-2.

Figures 1, 5:
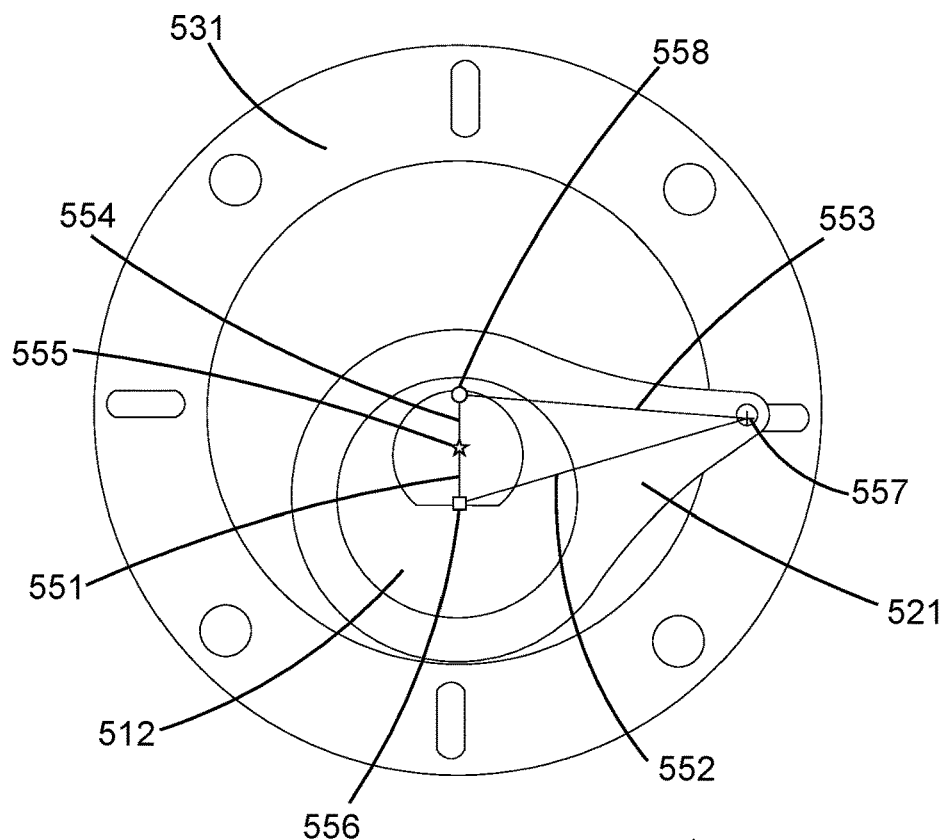
Figures 2, 5:
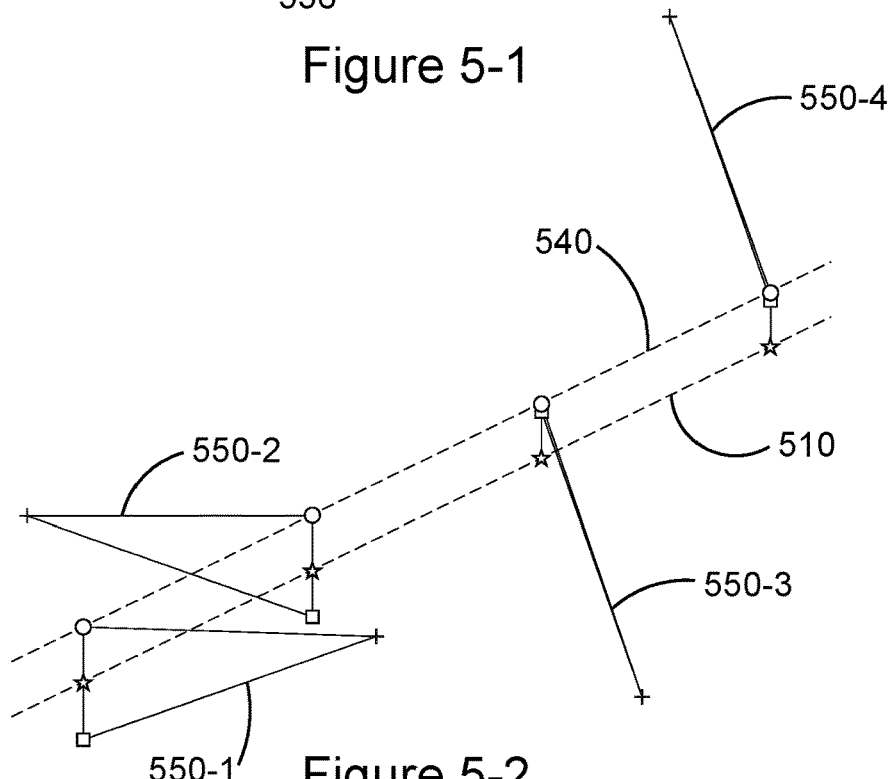

FIG. 5-1 shows an embodiment of a four-bar linkage that may be formed between a lobe 512, a connecting rod 521 and a ring 531. The lobe 512 may act as a crank 551 that extends from a rotational axis 555 of an input shaft to a center of geometry 556 of the lobe 512. The connecting rod 521 may act as a coupler 552 that extends from the center of geometry 556 of the lobe 512 to a pin 557 protruding from an end of the connecting rod 521. The pin 557 may be disposed within a slot in the ring 531. When the pin 557 bottoms out within the slot, the ring 531 may begin to act as a follower 553 that extends from the pin 557 to a rotational axis 558 of an output shaft (hidden). A housing (not shown) may maintain an axial offset between the output shaft and the input shaft to form a ground 554. This four-bar linkage may allow for the connecting rod 521, ring 531 and output shaft to rotate at a different speed and provide a different torque than input by the input shaft. In the embodiment shown, the connecting rod 521, ring 531 and output shaft rotates at half a speed of rotation on average of the input shaft. Also in the embodiment shown, the output shaft may provide twice the torque on average of the input shaft.

FIG. 5-2 shows an embodiment of four four-bar linkages 550-1, 550-2, 550-3, 550-4 that all share a common input shaft 510 and output shaft 540. To form these four four-bar linkages 550-1, 550-2, 550-3, 550-4 two lobes may each act as a double crank for two different four-bar linkages. Each of four individual connecting rods may act as a coupler for a unique four-bar linkage and each of four individual rings may act as a follower for one of the four-bar linkages. While four four-bar linkages are shown in the present embodiment, additional four-bar linkages may be included in other embodiments to provide a smoother output motion.

Figures 1, 6:
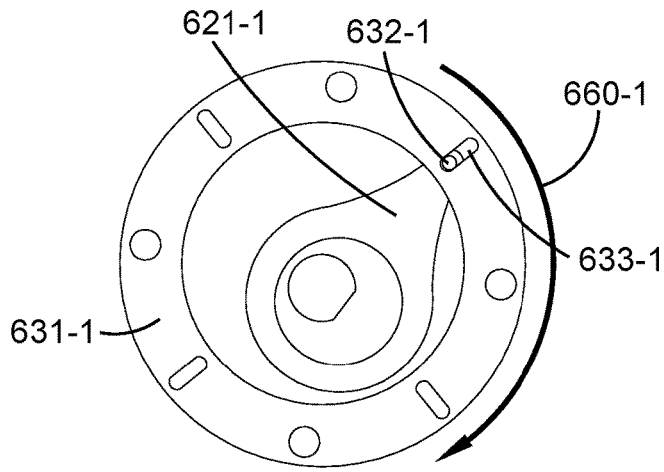
Figures 2, 6:
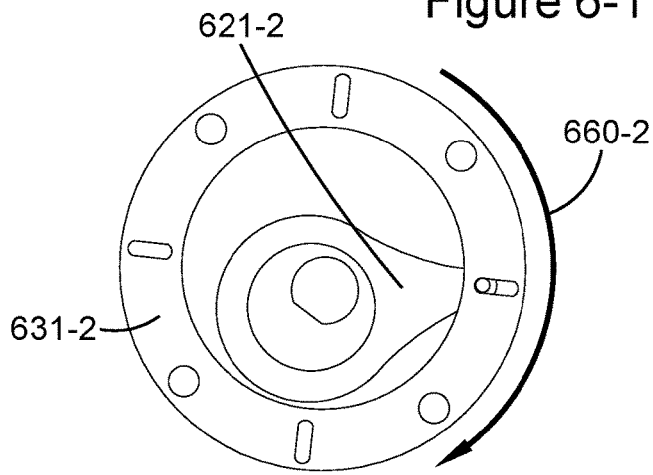
Figures 3, 6:
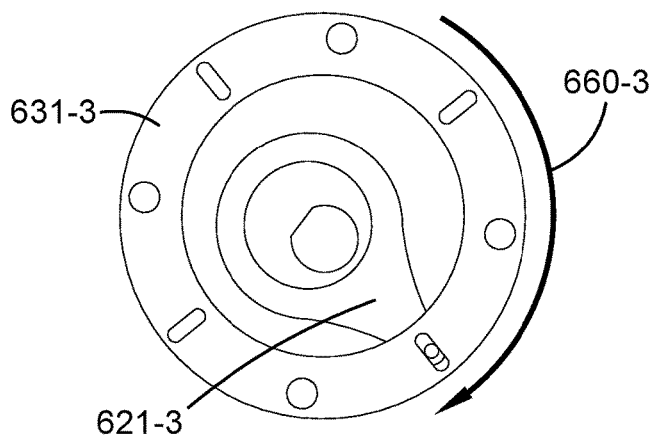

FIGS. 6-1, 6-2 and 6-3 show several embodiments of power quadrants 660-1, 660-2, 660-3 through which each of four four-bar linkages may pass at some point during a complete cycle. Within these power quadrants 660-1, 660-2, 660-3, a connecting rod 621-1, 621-2, 621-3 of each four-bar linkage may engage with its respective ring 631-1, 631-2, 631-3 as a slidable attachment connecting the connecting rod 621-1, 621-2, 621-3 to the ring 631-1, 631-2, 631-3 reaches an end of its radial travel. For example, as can be seen in the embodiments shown, when entering a power quadrant, a pin 632-1 of the connecting rod 621-1 may begin to bottom out within a slot 633-1 of the ring 631-1, as shown in FIG. 6-1, and then release when exiting the power quadrant 660-3, as shown in FIG. 6-3. During this engagement, the connecting rod 621-1, 621-2, 621-3 may pull the ring 631-1, 631-2, 631-3 around its rotational axis. When four four-bar linkages share a common input shaft and output shaft, each of the four-bar linkages' power quadrants may share the same physical position around the output shaft, at different times however, so as to generate a smooth transmission of rotation from the input shaft to the output shaft. In order to balance the four-bar linkages, when a four-bar linkage is opposite its power quadrant, the radially translatable connector may also reach an end of its radial travel.

Figures 1, 7:
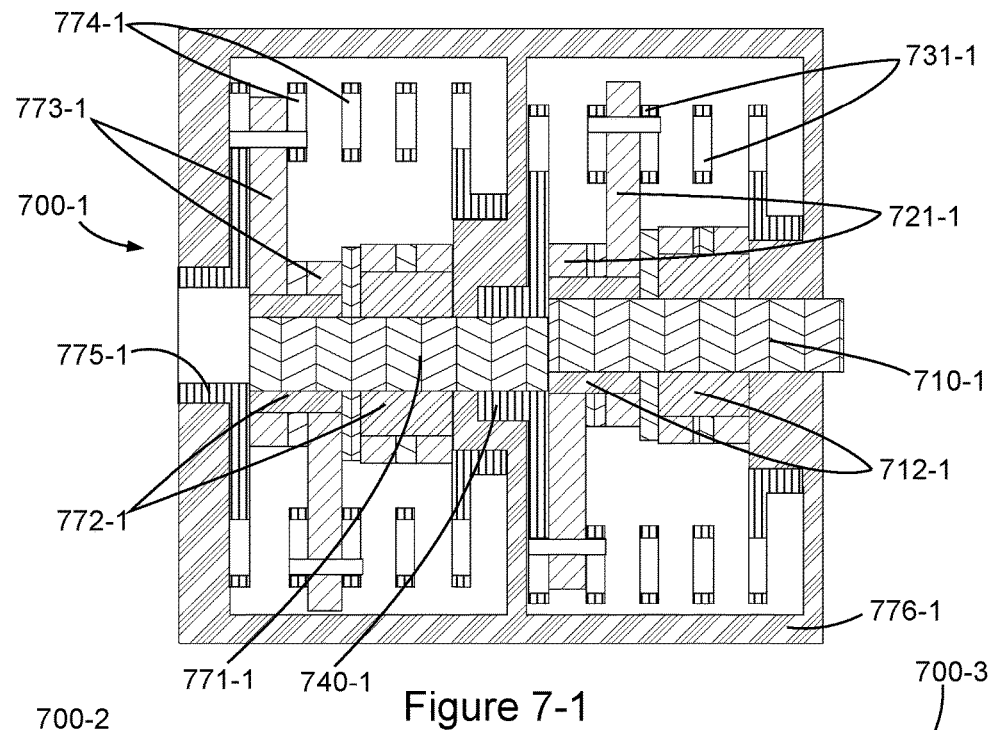
Figures 2, 7:
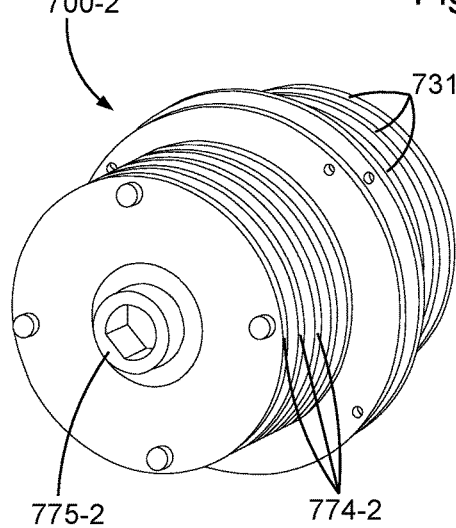
Figures 3, 7:
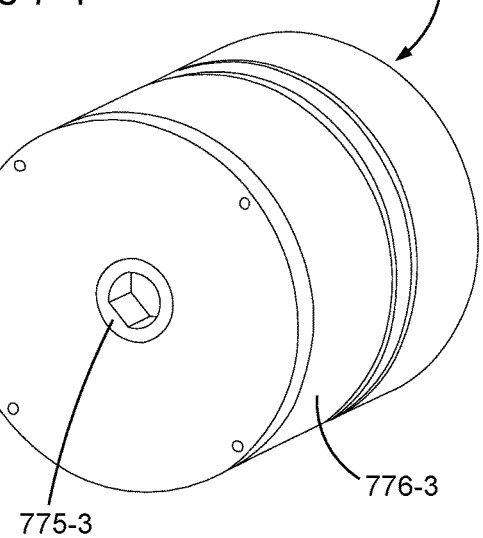

FIGS. 7-1, 7-2 and 7-3 show embodiments of a gearless transmission 700-1, 700-2, 700-3 comprising two sets of input shafts, lobes, connecting rods, rings and output shafts. Specifically, the gearless transmission 700-1, 700-2, 700-3 may comprise a first input shaft 710-1, two lobes 712-1, two connecting rods 721-1, rings 731-1, 731-2 and an output shaft 740-1. The output shaft 740-1 may be axially offset from the input shaft 710-1. The output shaft 740-1 may be rigidly secured to an additional input shaft 771-1 with its own additional lobes 772-1 extending radially from the additional input shaft 771-1 in opposite directions from one another. Each of the additional lobes 772-1 may comprise two additional connecting rods 773-1 extending radial therefrom and freely rotatable thereabout. Each of the additional connecting rods 773-1 may be slidably attached to an additional unique ring 774-1, 774-2 disposed around the additional input shaft 771-1. The additional rings 774-1, 774-2 may be fixed together to form a hollow body and secured to an additional output shaft 775-1, 775-2, 775-3. The additional output shaft 775-1, 775-2, 775-3 may be positioned non-coaxially with the additional input shaft 771-1 but, due to the two offsets, coaxially with the first input shaft 710-1. Additionally, a housing 776-1, 776-3, as shown in FIGS. 7-1 and 7-3, may maintain coaxiality between the first input shaft 710-1 and the additional output shaft 775-1, 775-2, 775-3. Given this double configuration, the additional output shaft 775-1, 775-2, 775-3 may provide four times the torque on average of the first input shaft 710-1. While two sets of shafts, lobes, connecting rods and rings have been shown in this embodiment, any number of additional sets could be included in a similar manner.

Whereas certain embodiments have been described in particular relation to the drawings attached hereto, it should be understood that other and further modifications apart from those shown or suggested herein, may be made within the scope and spirit of the present disclosure.

The invention claimed is:

1. A gearless transmission, comprising:
   a plurality of lobes extending radially from an input shaft;
   each of the lobes comprising a plurality of connecting rods freely rotatable thereabout;
   each of the connecting rods slidably attached to a hollow body surrounding the input shaft; and
   the hollow body secured to an output shaft.

2. The gearless transmission of claim 1, wherein two lobes extend from the input shaft in opposite directions from one another.

3. The gearless transmission of claim 1, wherein each of the lobes comprises two connecting rods extending radially therefrom.

4. The gearless transmission of claim 1, wherein the hollow body comprises a plurality of rings fixed together, and each of the connecting rods is slidably attached to a unique ring.

5. The gearless transmission of claim 4, wherein each of the connecting rods is slidably attached to a ring via a pin and slot combination.

6. The gearless transmission of claim 4, wherein each of the connecting rods and rings comprises a generally flat geometry.

7. The gearless transmission of claim 6, wherein each of the connecting rods is substantially identical to each other connecting rod and each of the rings is substantially identical to each other ring.

8. The gearless transmission of claim 6, wherein each of the connecting rods and rings is formed of polycrystalline diamond or carbide.

9. The gearless transmission of claim 1, wherein the connecting rods are radially slidable relative to the hollow body.

10. The gearless transmission of claim 1, wherein the output shaft rotates at half a speed of rotation on average of the input shaft and provides twice the torque on average of the input shaft.

11. The gearless transmission of claim 1, wherein each of the lobes comprises a non-coaxial hole therein and the input shaft is fitted within the hole.

12. The gearless transmission of claim 1, wherein the output shaft is non-coaxially parallel with the input shaft.

13. The gearless transmission of claim 12, further comprising a housing maintaining an axial offset between the input shaft and the output shaft.

14. The gearless transmission of claim 12, further comprising:
an additional input shaft stemming from the output shaft;
additional lobes extending radially from the additional input shaft;
each of the additional lobes comprising additional connecting rods freely rotatable thereabout;
each of the additional connecting rods slidably attached to an additional hollow body surrounding the additional input shaft; and
the additional hollow body secured to an additional output shaft; wherein
the additional output shaft is coaxial with the input shaft.

15. The gearless transmission of claim 1, wherein a four-bar linkage is formed comprising a lobe acting as a crank, a connecting rod acting as a coupler and the hollow body acting as a follower.

16. The gearless transmission of claim 15, wherein a plurality of four-bar linkages are formed wherein each of the lobes acts as a crank for a plurality of unique four-bar linkages, each of the connecting rods acts as a coupler for a unique four-bar linkage, and the hollow body acts as a follower for each of the unique four-bar linkages.

17. The gearless transmission of claim 16, wherein each of the four-bar linkages comprises a power quadrant wherein its connecting rod engages the hollow body.

18. The gearless transmission of claim 17, wherein a plurality four-bar linkages comprise time-delayed overlying power quadrants.

19. The gearless transmission of claim 17, wherein, when a four-bar linkage is in its power quadrant, its connecting rod reaches an end of its slidability.

20. The gearless transmission of claim 19, wherein, when the four-bar linkage is opposite its power quadrant, the connecting rod also reaches the end of its slidability.

* * * * *